(12) United States Patent
Kress

(10) Patent No.: US 6,957,936 B2
(45) Date of Patent: Oct. 25, 2005

(54) TOOL FOR MACHINING PIPE ENDS

(75) Inventor: Dieter Kress, Aalen (DE)

(73) Assignee: Mapal Fabrik fur Prazisionswerkzeuge Dr. Kress KG, (DE)

( * ) Notice: Subject to any disclaimer, the term of this patent is extended or adjusted under 35 U.S.C. 154(b) by 362 days.

(21) Appl. No.: 10/317,243

(22) Filed: Dec. 11, 2002

(65) Prior Publication Data
US 2003/0113176 A1    Jun. 19, 2003

(30) Foreign Application Priority Data
Dec. 17, 2001  (DE) ............................... 101 63 473

(51) Int. Cl.⁷ .......................................... B23B 29/034
(52) U.S. Cl. ..................... 408/181; 408/190; 82/113
(58) Field of Search .................... 82/113, 123; 407/50, 407/61, 113, 144; 408/181, 187, 188, 190, 408/191

(56) References Cited

U.S. PATENT DOCUMENTS

| | | | | |
|---|---|---|---|---|
| 2,637,894 A | | 5/1953 | Smoleny ..................... 29/103 |
| 3,103,140 A | * | 9/1963 | Connelly .................... 82/131 |
| 3,122,818 A | * | 3/1964 | Nance ........................ 407/36 |
| 3,717,055 A | * | 2/1973 | Pendleton ................... 82/113 |
| 3,999,452 A | * | 12/1976 | Larsen ....................... 82/113 |
| 4,231,691 A | * | 11/1980 | Pape et al. ................... 408/185 |
| 4,375,708 A | * | 3/1983 | Hellnick et al. ............... 470/58 |
| 4,693,643 A | | 9/1987 | Heyworth ..................... 408/82 |
| 4,906,294 A | | 3/1990 | von Haas et al. ............. 75/228 |
| 5,314,270 A | * | 5/1994 | Lavancy et al. ............. 408/1 R |
| 6,039,515 A | * | 3/2000 | Lamberg ..................... 408/188 |
| 6,238,146 B1 | * | 5/2001 | Satran et al. ................ 407/113 |

FOREIGN PATENT DOCUMENTS

| | | | |
|---|---|---|---|
| DE | 1402898 | 7/1969 | |
| DE | 29622294 | 4/1997 | |
| DE | 10026461 | 12/2001 | |
| EP | 0 081 775 A | 6/1983 | |
| EP | 0922518 | 6/1999 | |
| GB | 2371260 | 7/2002 | |
| JP | 05016011 A | * 1/1993 | ............ B23C 5/20 |
| WO | 92/20485 | 11/1992 | |

* cited by examiner

Primary Examiner—Derris Banks
Assistant Examiner—Michael W. Talbot
(74) Attorney, Agent, or Firm—Ostrolenk, Faber, Gerb & Soffen, LLP

(57) ABSTRACT

A tool for removing material or machining the end of a pipe. The tool having at least one and preferably two blade plates. Each blade plate includes a first cutter for machining an end surface of the pipe, a second cutter adjacent the first cutter for producing an internal chamfer in the pipe end and a third cutter adjacent the first cutter positioned for producing an external chamfer adjoining the end surface of the pipe end. Devices guide and permit movement of the cutters either radially or axially. The shaping of the cutter is disclosed.

10 Claims, 4 Drawing Sheets

TOOL FOR MACHINING PIPE ENDS

DESCRIPTION

The invention relates to a tool for the material removing machining of pipe ends with cutters for end machining and for forming chamfers.

BACKGROUND OF THE INVENTION

Tools of the type disclosed can be used, for example, for providing an end surface having an internal chamfer and an adjoining external chamfer on a pipe end. Three tools of this type can be provided for this purpose, said tools machining and producing the end surface and the chamfers in three working steps. It has been attempted to combine these individual working operations into one working operation using a suitable tool. For this purpose, a tool can be provided with various cutters which machine the pipe end in parallel and thereby machine and/or produce the chamfers and the end surface of the pipe end in one working operation. However, although a tool of this type is suitable for machining the pipe end in one working operation, it has a very complex construction for this purpose and is correspondingly expensive to produce. In addition, the various cutters must be supplied and produced individually and may also be easily mixed up when handling the tool. Furthermore, these individual cutters have to be set/adjusted in a spatially complicated manner relative to one another and with respect to the workpiece contour, in order to obtain a good result.

SUMMARY OF THE INVENTION

The object of the invention, therefore, is to provide a tool of the type mentioned at the beginning which avoids these disadvantages.

In order to achieve this object, a tool is proposed which includes cutters for machining or producing the end surface and adjoining internal and external chamfers on the pipe end. At least one blade plate has a first cutter for machining and/or producing the end surface of the pipe end, a second cutter for producing and/or machining an internal chamfer adjoining the end surface, and a third cutter for producing and/or machining a further external chamfer adjoining the end surface. The end surface and the two chamfers can thus be machined and/or produced on the pipe end in one working operation. The at least one blade plate has merely to be positioned exactly relative to the pipe end. Complicated, relative, spatial setting and adjustment of a plurality of blade plates with respect to one another can thus be avoided.

In a preferred embodiment, two blade plates are fixed on the tool so that the first cutter of the first and second blade plates machines the end surface of the pipe end, the second cutter of the first blade plate produces and/or machines the internal chamfer, and the third cutter of the second blade plate produces and/or machines the external chamfer. During machining of the end surface, the cutting can be divided between the two blade plates. The tool may cut in a multi-edged manner, which contributes to an increase in the machining values. The first cutters of the first and second blade plates can be arranged in the same plane axially, so that they machine the end surface of the pipe end equally in a material removing manner.

In a further preferred embodiment, there is a radial setting device for the at least one blade plate. Setting the blade plate to different radii adapts the tool for machining pipe ends with different diameters and/or wall thicknesses.

In a preferred embodiment, the first cutter in the at least one blade plate is longer than the width of the end surface of the pipe end which is to be machined. In conjunction with the radial setting device, two blade plates can be positioned such that the end surface and the two chamfers of the pipe end can be machined in one working operation. In this case, the end surface is machined by both blade plates and the chamfers are machined in each case only by one blade plate. For this purpose, one of the blade plates can be set to a larger radius by the radial setting device. Radius here describes the shortest distance between the central point of the blade plate and the central axis of the tool. Depending on the radial setting of the two blade plates, in an extreme situation, e.g. if both blade plates lie on the same radius, an end surface can be machined, which corresponds to the length of the first cutter of the blade plates. In another extreme situation, the radii of the blade plates can be selected to differ such that there is no longer an end surface between the internal chamfer and the external chamfer. The size of the chamfers therefore depends on the radial setting of the blade plates. Furthermore, the tool can thus also be set to coordinate with pipes having different wall thicknesses.

In the invention, a blade plate is distinguished by a first cutter for machining and/or producing the end surface of the pipe end, a second cutter for producing and/or machining an internal chamfer adjoining the end surface, and a third cutter for producing and/or machining a further external chamfer adjoining the end surface. With a blade plate of this type, the end surface and the internal/external chamfers of the pipe end can be machined and/or produced in one working operation. However, it is also conceivable to machine and/or to produce only the end surface and one of the chamfers. Finally, the blade plate can also be used to machine and/or to produce the end surface and one of the two chamfers simultaneously. With a single configuration of the blade plate, three different working steps can therefore be carried out on a pipe end. These working steps can be carried out either individually or in parallel, or else in part individually or in parallel in a freely selectable manner.

In another preferred embodiment, the blade plate is a turning plate having a plurality of usable cutting regions and the regions in each case have a first, second and a third cutter. Depending on the configuration of the turning plate, a worn cutting region can be interchanged for a cutting region with cutters which are still sharp, by rotating and/or turning said turning plate. This increases the overall service life of the blade plate and therefore the economic efficiency.

The invention is explained in greater detail below with reference to the drawings:

DESCRIPTION OF PREFERRED EMBODIMENTS

Figure 1:
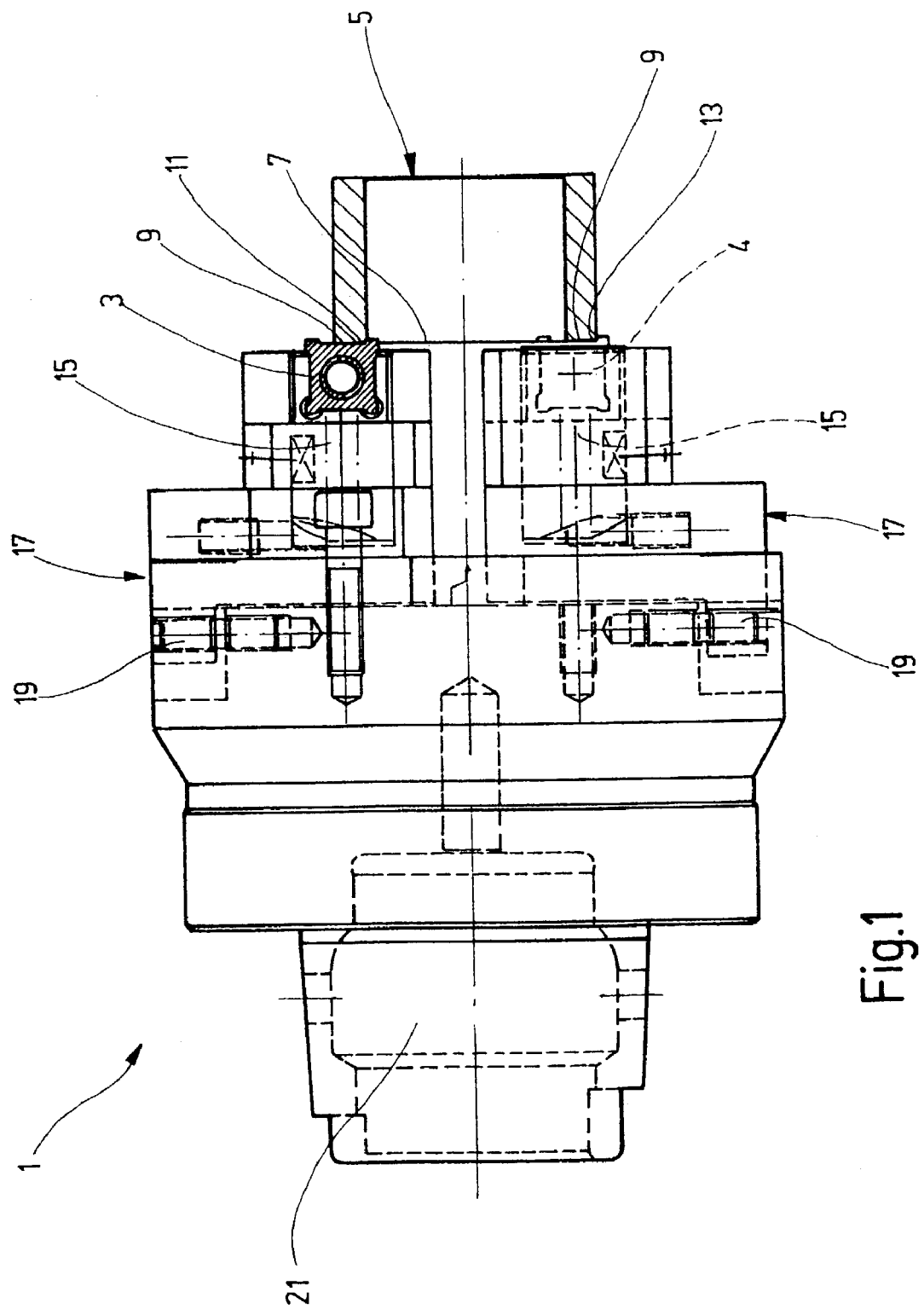
FIG. 1 shows a side view of a tool having two blade plates.

FIG. 1 shows a tool 1 having a total of two blade plates 3, 4. The plates are identical and can therefore be interchanged. A tubular workpiece 5 having a pipe end 7 is illustrated in section. The blade plates 3, 4 machine and/or produce an end surface 9 of the pipe end 7. Furthermore, in the illustrated position and setting of the tool 1 relative to the workpiece 5, an internal chamfer 11 and an external chamfer 13 are produced and/or machined on the surface 9. The first blade plate 3 is shaped and radially positioned to machine the internal chamfer 11 and the end surface 9 simultaneously. In contrast, the second blade plate 4 is shaped and radially positioned to machine the end surface 9 and the external chamfer 13 simultaneously.

The length of the tubular workpiece 5 is insignificant for the machining of the end surface 9 and of the chamfers 11, 13. The ends of long pipes can thus be machined just as readily as annular attachments fitted, for example, onto assemblies.

For machining of the pipe end 7, i.e. of the end surface 9 and the chamfers 11, 13, the tool 1 and the workpiece 5 are caused to rotate relative to each other. In the process, either the tool 1 or the workpiece 5 can be stationary. The tool 1 and the workpiece 5 are moved toward each other, specifically for a distance until the end surface 9 and the chamfers 11, 13 are completely produced and/or machined. For this purpose, the workpiece can be stationary and the tool can be moved in the advancing direction toward the workpiece 5, or vice versa. Advancing direction is understood to mean the movement of the tool 1 along its longitudinal axis onto the workpiece, i.e. from left to right, as seen in the orientation of FIG. 1. As soon as the end surface 9 and the chamfers 11, 13 have been completely machined, the advancing movement can be stopped, and the tool 1 can be separated again from the workpiece 5 counter to the advancing direction. Further advancing of the tool 1 would merely cause a greater removal of material from the workpiece 5, but would not bring about any improvement in the end surface 9 and in the chamfers 11, 13.

Furthermore, for both or each blade plate 3, 4, the tool 1 has an axial setting device 15 on which the blade plates 3, 4 are fixed. Alternatively an axial setting device is provided only on one of the blade plates 3, 4. The blade plates 3, 4 are fixed in a suitable manner, for example by clamping, soldering, bonding, as a single piece or else directly on the base body of the tool 1. The blade plates 3, 4 can be adjusted via the axial setting device 15, so that the blade plates 3, 4 lie axially in a plane, which is perpendicular with respect to the central axis of the tool 1, and the plates can thereby be brought into engagement with the pipe end of the workpiece 5. Division of the cutting can thereby be achieved, and the tool 1 is able to cut in a multi-edged manner. This increases the service life of the blade plates 3, 4.

Furthermore, the tool 1 here has a respective radial setting device 17 with a radial setting screw 19 in each case, for each or both blade plates 3, 4. A radial setting device may be provided for only one blade plate 3, 4. The radial setting devices 17 set the blade plates 3, 4 to respective, possibly different radii. It can be seen that the blade plate 4 has been set to a smaller radius than the blade plate 3. This ensures that the blade plate 4, which lies radially further inward, can machine the external chamfer 13, and the blade plate 3 can machine the internal chamfer 11.

The blade plates 3, 4 may be set to any desired radii via the radial setting device 17. Diverse possibilities for using the tool 1 are thus produced. The following setting/machining possibilities are produced as a function of the different pipe diameters and wall thicknesses and of the aim of machining the pipe end 7 of the workpiece 5 and of the advancing path:

In the same radius setting, it is possible to machine either just the end surface 9 or one of the chamfers 11, 13 with both blade plates.

Furthermore, the blade plates 3, 4 can be set such that the end surface 9 and one of the chamfers 11, 13 are machined simultaneously.

In a third operating mode, in which the wall thickness of the workpiece 5 corresponds to the effective cutting width of the blade plates 3, 4, the end surface 9 and the chamfers 11, 13 are machined simultaneously.

In the first and third operating modes, one of the blade plates 3, 4 could even be omitted. In this case, only one of the blade plates 3, 4 therefore has to be aligned relative to the workpiece 5.

The different radii setting is expediently to be undertaken if the wall thickness of the workpiece 5 is less than the effective cutting width of the blade plates 3, 4 while nevertheless the end surface 9 and the chamfers 11, 13 are to be machined simultaneously in one working operation. This operating mode corresponds to the setting of the tool 1 that is illustrated in FIG. 1. The radii of the blade plates 3, 4 can be changed from time to time in order to achieve a more uniform wearing of the blade plates 3, 4. The blade plate having the larger radius is thus set to the smaller radius, and vice versa.

Furthermore, this setting may be expedient in order to obtain a more uniform wearing of the blade plates 3, 4 if only the end surface 9 of workpieces 5 having very small wall thicknesses is to be machined.

The tool 1 illustrated in FIG. 1 may be connected to a machine tool via a tapered hollow shank 21 to cause the tool to rotate.

Figure 3:
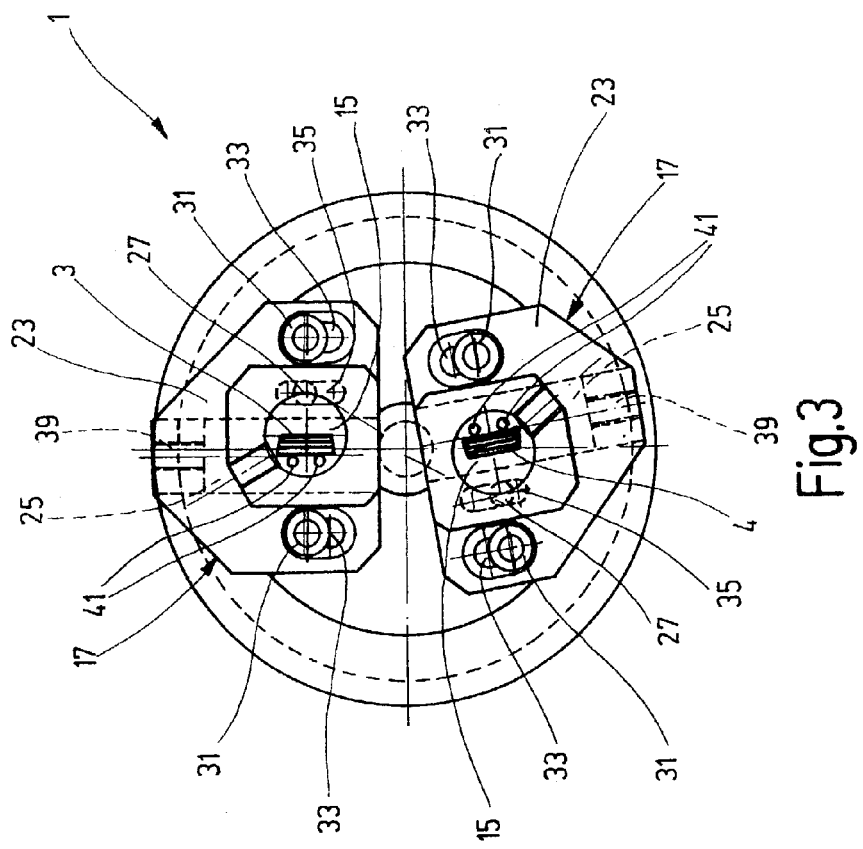
FIGS. 2 and 3 show front views of the tool shown in FIG. 1 with and without inserted radial slides.
Figure 2:
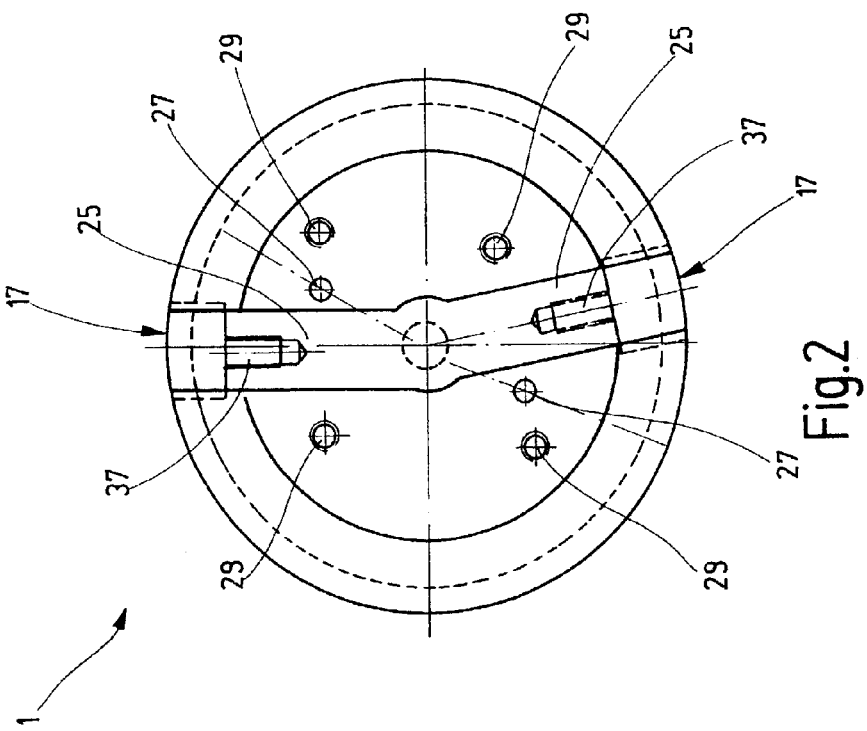

FIGS. 2 and 3 show a front view of the tool illustrated in FIG. 1. Identical parts are provided with the same reference numbers, so that reference is made in this respect to the description for FIG. 1.

FIG. 3 shows two radial slides 23 which are part of the radial setting device 17. The radial slides 23 are mounted in a radially displaceable manner in two guide grooves 25 in FIG. 2.

FIG. 2 shows that the tool has two guide bolts 27 and four threaded holes 29 for clamping screws 31 illustrated in FIG. 3.

The radial slides 23 illustrated in FIG. 3 include slots 33, 35. The slots receive the clamping screws 31 and the guide bolts 27, respectively, on which the radial slides 23 are guided, in addition to the guide groove 25. In addition to the guidance of the radial slide 23, the clamping screws 31 are used in the slots 33 for radially fixing the radial slides 23 of the radial setting device 17. FIGS. 2 and 3 show that the radial setting devices 17 have threaded holes 37 and 39 into which the radial setting screw 19, for example, a differential screw, can be placed. That screw enables radial adjustment of the radial slides 23 and therefore of the blade plates 3, 4. After setting of the desired radii, the clamping screws 31 can be tightened and the blade plates 3, 4 can therefore be fixed at the desired radius.

Coolant outlets 41 are in the immediate vicinity of the cutting region of the blade plates 3, 4. The blade plates 3, 4 and the machining location can be charged with coolant and/or lubricant and/or flushing agent from the outlets 41.

Furthermore, the guide grooves 25 are at an angle different from 180° with respect to one another. As a result, the blade plates 3, 4 are arranged so that they do not lie diametrically opposite one another on the tool 1. This can contribute to reducing the tendency of the tool 1 to vibrate during operation.

Figure 4:
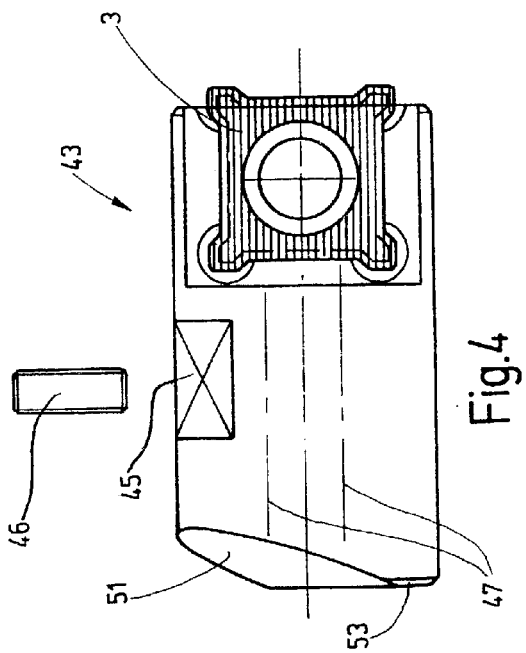
FIG. 4 shows a side view of a cutting insert.

FIG. 4 shows a side view of a cutting insert 43 which is part of the axial setting device 15.

The blade plate 3 is fixed on the cutting insert 43 in a suitable manner. It is possible for the blade plate 3 and the cutting insert 43 to be a single piece.

The cutting insert 43, which also serves here as a cutter holder, has a clamping surface 45 against which a clamping screw 46 (FIG. 4) can be clamped. The basic shape of the cutting insert 43 is cylindrical. It can be placed axially displaceably in a corresponding, hollow cylindrical recess. However, other suitable basic shapes, for example cubic or triangular, are also possible.

It is also possible to provide guiding aids which secure the cutting insert 43 against inadvertent rotation in the recess of the tool 1. In order to replace the blade plate 3, the entire cutting insert 43 can therefore be removed from the tool 1.

The cutting insert is fixed in the cylindrical recess of the radial slide 23 and is clamped to the inner cylinder wall of the tool 1 by a clamping screw (not illustrated here) which presses against the clamping surface 45. The clamping screw has a two-dimensional end which interacts with the clamping surface 45. Inadvertent fixing of the cutting insert 43 in a rotated position is thus virtually eliminated. As a result, the blade plates 3, 4 are always aligned exactly with respect to the workpiece 5.

Coolant channels 47, which open into the coolant outlets 41 (not seen in FIG. 4), are indicated by two segmented lines.

An adjusting surface 51, which can cooperate with an adjusting wedge (not shown), is defined on the rear side of the cutting insert 43. A chamfer 53 runs along an end surface of the insert 43. The surface 51 is in the form of a section of a circle perpendicular to the plane of the drawing. The chamfer 53 eases the introduction of the cutting insert 43 into the cylindrical recess of the radial slide 23.

Figure 5:
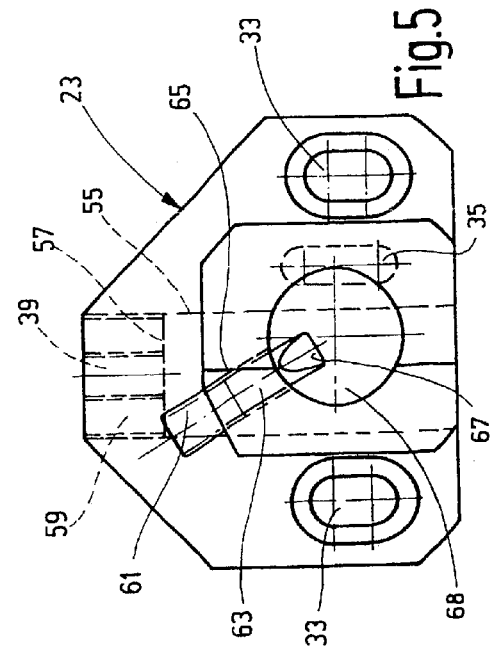
FIG. 5 is a separate plan view of one of the radial slides.

FIG. 5 shows the radial slide 23 illustrated in FIG. 3. Identical parts are provided with the same reference numbers. The radial slide 23 is part of the radial setting device 17. A guide rib 55 shown in dashed lines can be mounted displaceably in the guide groove 25. The guide rib 55 runs along the rear side of the radial slide 23. In the region of the threaded hole 29, the rib has a step 57 (in dashed lines), and forms a shoulder 59. The threaded hole 39 runs entirely in the shoulder 59. The guide groove 25 has, at its radially outwardly pointing end, a corresponding recess into which the threaded hole 37 opens. In the fitted state of the radial slide 23, i.e. when the guide rib 55 and the shoulder 59 are situated in the guide groove 25 and the corresponding recess, a radial setting screw 19 can be placed into the threaded holes 39 and 37 and can be operated to adjust the radial position of the radial slide 23. After adjustment of the radial position of the radial slide and therefore also of the blade plate 3, the plate 3 is fixed at the slots 33 by clamping screws 31 (not illustrated here).

A threaded pin or axial setting screw 61 and an adjusting part 63 having a threaded hole 65 are part of the axial setting device 15. The adjusting part 63 has a wedge surface 67 which can cooperate with the adjusting surface 51 of the cutting insert 43, such that, when the threaded pin 61 is screwed into the threaded hole 65, the cutting insert is moved forward in the advancing direction in the cylindrical recess 68 of the radial slide 23. The blade plate 3 can thus be adjusted in the axial direction in a simple manner by actuation of the threaded pin 61. When that adjustment is finished, the cutting insert 43 can be fixed securely in the tool 1 by the clamping screw and the clamping surface 45.

Figure 6:
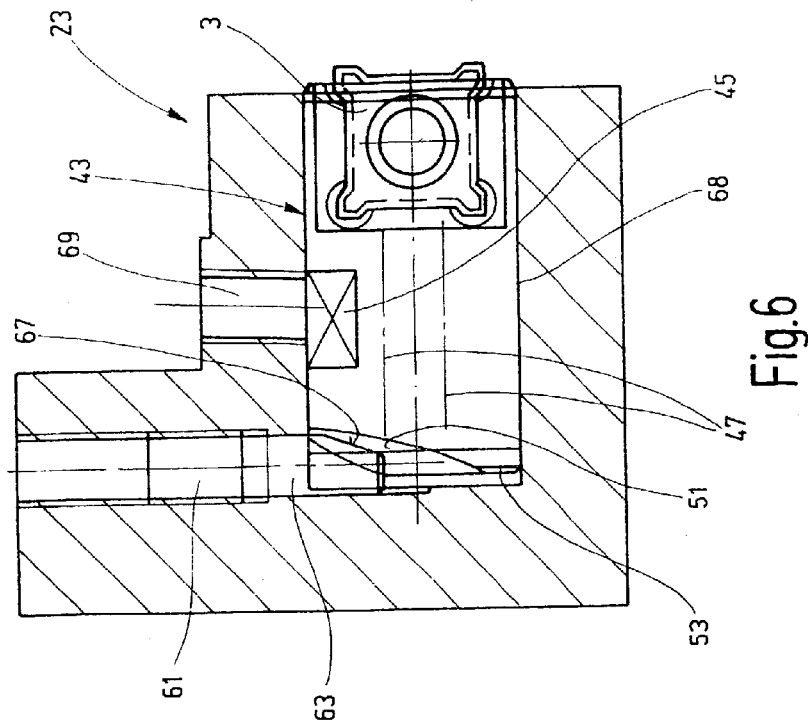
FIG. 6 is a diagrammatic section of the radial slide with the cutting insert shown in FIG. 4, and FIGS. 7 to 9 are various views of a blade plate.

FIG. 6 is a diagrammatic sectional illustration of the radial slide 23. In order to simplify the illustration, various elements have been rotated into the plane of the drawing. Identical parts are provided with the same reference numbers, as in the preceding Figures.

The essentially cylindrical cutting insert 43 is placed in the cylindrical recess 68. A threaded hole 69 receives a clamping screw described above, but not illustrated, and the screw presses against the clamping surface 45. The threaded hole 69 is inclined slightly radially to the outside in the advancing direction toward the plane which is perpendicular with respect to the central axis of the cutting insert 43. This means that the clamping forces of the clamping screw are divided into a component lying in the plane and into a component acting counter to the advancing direction. The force component acting counter to the advancing direction therefore presses the cutting insert 43 counter to the advancing direction into the cylindrical recess 68 of the radial slide 23. This presses the wedge surface 67 of the adjusting part 63 and the adjusting surface 51 against each other to ensure that an axial adjustment, done with the threaded pin 61, is not changed by the clamping forces.

Figure 7:
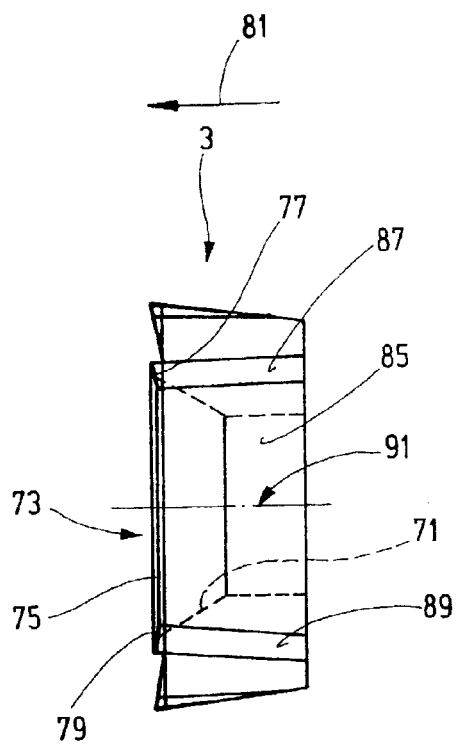
Figure 8:
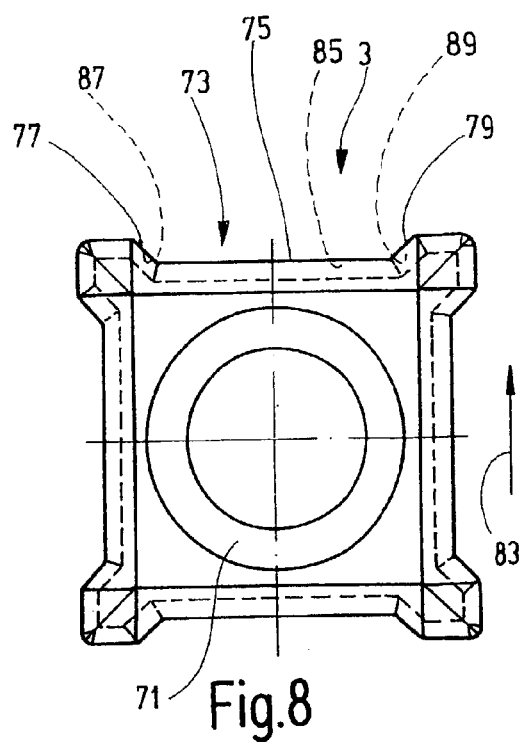
Figure 9:
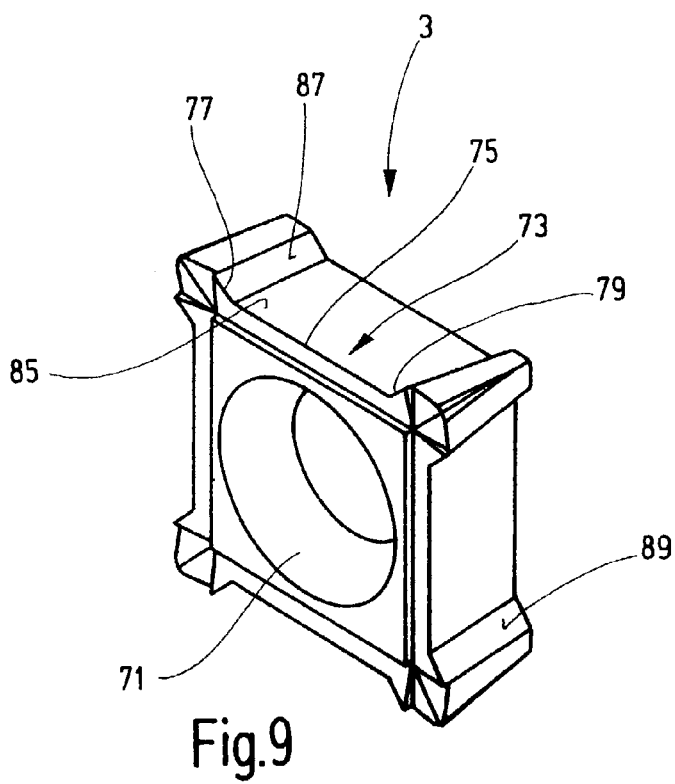

FIGS. 7 to 9 detail one of the blade plates 3, 4 wherein FIG. 7 is a side view, FIG. 8 a plan view, and FIG. 9 a perspective view of the blade plate. In the case of details which are illustrated equally in FIGS. 7 to 9, reference is made simultaneously to those Figures. The description also applies to the blade plate 4.

The blade plate 3 is rotationally symmetrical at an angle of 90°. The description below is for a 90° cutout of the blade plate 3 but applies to the further three rotationally symmetrical cutouts.

The blade plate 3 is a turning plate or interchangeable plate and has a central opening 71 into which a fastening screw can be installed. The blade plate 3 has four cutting regions 73. If one cutting region 73 becomes worn, another cutting region 73, which is still sharp, can be positioned, by simply rotating the blade plate 3 through 90° about the central opening 71, such that the cutting region machines the workpiece 5. Each cutting region 73 has three cutters 75, 77, 79. The pair of cutters 75, 77 on the one hand and the pair of cutters 75, 79 on the other hand are adjacent and define an angle with respect to each other.

An arrow 81 in FIG. 7 which indicates the machining direction along which the blade plate 3 is guided relative to the machining surface of the workpiece 5.

FIG. 8 shows one of four possible advancing directions of the blade plate 3 by an arrow 83. The first cutter 75 is for machining the end surface 9 of the pipe end 7. It is perpendicular to the machining and advancing direction. The cutters 77, 79 are at an angle with respect to the cutter 75, which determines the angle of the chamfers 11, 13. For this purpose, the cutters are at an angle with respect to an imaginary plane which is perpendicular to the advancing direction. That angle corresponds to the angle of the chamfers 11, 13.

The cutters 77, 79 can additionally be tilted about an angle with respect to an imaginary plane with is perpendicular to the machining direction, and that is the plane of the drawing of FIG. 8, so that the cutters execute a shearing cut on the chamfers 11, 13.

The blade plate 3 tapers counter to the machining direction. Each cutter 75, 77, 79 is therefore relief ground. This is apparent at the surfaces 85, 87, 89 which are respectively adjacent to one of the cutters 75, 77, 79 and which are inclined, counter to the machining direction, slightly toward the central axis, indicated segmented line 91, of the blade plate 3.

The cutters 75, 77, 79 can be used in a wide variety of ways in conjunction with the axial/radial setting devices 15, 17 of the tool 1. For a workpiece having a wall thickness which is less than the length of the first cutter 75, it is possible to produce and/or to machine only one end surface 9. For a workpiece 5 of this type, if the blade plate 3 is correspondingly adjusted radially, then one of the cutters 77, 79 also comes into engagement with the workpiece, so that either an internal chamfer 11 or an external chamfer 13 is machined or produced.

If two or more blade plates 3, 4 are used, for example, the blade plate 3 may machine the end surface 9 and the internal chamfer 11, while the blade plate 4 may machine the end surface 9 and the external chamfer 13. In a further possibility, the blade plate 3 may be adjusted such that one of the cutters 77, 79 comes into engagement with one of the chamfers 11, 13 of the pipe end 7 while the advance of the tool 1 is restricted in such a manner that the first cutter 75 does not come into engagement with the end surface 9 of the pipe end 7. In this case, it is possible to produce and/or machine just one of the chamfers 11, 13.

Furthermore, the wall thickness of the workpiece 5 may be greater than the width of the first cutter 75, but not wider than the effective width of the cutting region 73. In this case, both end surfaces 9 and the chamfers 11, 13 can be produced and/or machined on the pipe end 7 of the workpiece 5 with just one blade plate 3 in one working operation. If the advance is restricted, it is also possible to produce and/or to machine just the chamfers 11, 13.

Furthermore, it is possible to set the angles which the cutters 77, 79 take up with respect to the cutter 75 so that they differ. This enables chamfers having different chamfer angles to be produced at the pipe end 7.

The blade plates 3, 4 may be directly clamped to the tool 1, particularly to the main body of the tool 1, preferably by a clamping claw, or the plates may be screwed or soldered or connected in another suitable manner. In particular for small pipe diameters, preferably less than 6 mm, the cutters 75, 77, 79 can be made as a single piece together with the tool 1. In this case, it would be advantageous if the blade plates 3, 4, and therefore also the means of fixing them, can be omitted.

Finally, it is possible to design the blade plate 3 in any desired polygonal shape. Any desired number of cutting regions 73 can thus be provided on the blade plate 3. The active cutting region 73 is then interchanged by rotation of the blade plate 3 about the corresponding polygonal angle.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool for machining a pipe end by relative rotation of the tool and the pipe end, the tool, comprising:
   two blade plates fixed on the tool;
   a first cutter on each of the blade plates and shaped and positioned for producing or machining a flat end surface of the pipe end;
   a second cutter on each of the blade plates and shaped and positioned for producing or machining an internal chamfer in the pipe end adjoining the end surface;
   a third cutter on each of the blade plates for producing or machining an external chamfer on the pipe end adjoining the end surface, the tool having a rotation axis;
   a radial setting device for setting the radial position of the blade plates; and
   an axial setting device for setting the axial position of the blade plates with respect to the pipe end, first and second blade plates being arranged on the tool so as to not lie diametrically opposite one another around the tool axis wherein the radial setting device is adjusted separately from the axial setting device.

2. The tool of claim 1, further comprising a cutting insert of the tool for receiving each of the blade plates.

3. The tool of claim 1, wherein each of the blade plates are connected directly to the tool.

4. The tool of claim 3, wherein each of the blade plates are connected to the tool by one of clamping with a clamping claw, being screwed thereto or being soldered thereto.

5. The tool of claim 3, wherein the blade plate and the cutting insert are a single piece.

6. The tool of claim 1, wherein the blade plates are shaped and positioned and the tool and the blade plates are so relative rotative that the end surface of the pipe end and the internal and the external chamfers are produced and machined in a single working operation by the first and second blade plates.

7. The tool of claim 1, further comprising the respective radial setting device for setting the radial position of each of the blade plates.

8. The tool of claim 1, wherein the radial setting device comprises a radial slide disposed on the tool and along which each blade plate is moveable.

9. The tool of claim 1, further comprising a respective one of the axial setting devices for each of the first and second blade plates.

10. The tool of claim 1, wherein the axial setting device comprises an axial setting screw, and adjusting part operable by the screw and a clamping surface on the adjusting part on which the screw is clampable.

* * * * *